United States Patent Office 3,520,781
Patented July 14, 1970

3,520,781

METHOD FOR LOWERING DARK CONDUCTIVITY OF THIN SEMICONDUCTING FILMS

Benjamin B. Snavely and Franz Trautweiler, Rochester, N.Y., assignors to Eastman Kodak Company, Rochester, N.Y., a corporation of New Jersey No Drawing. Filed Nov. 29, 1967, Ser. No. 686,683
Int. Cl. C13b *5/00*
U.S. Cl. 204—14 6 Claims

ABSTRACT OF THE DISCLOSURE

Method for decreasing the dark conductivity of vapor deposited ionic semiconducting films without annealing. The film is electrolytically treated by being immersed in a solution containing the anion of the film. The film itself is used as the anode, and direct current is passed between the film and a cathode.

BACKGROUND OF THE INVENTION

This invention relates to vapor-deposited ionic semiconducting films and, more particularly, to a method for decreasing the dark conductivity of such thin films.

Vapor deposited films of certain semiconducting materials have photosensitive properties and are commonly used in solid state devices such as photoconductors, photovoltaic cells, solar batteries, thin film transistors, piezoelectric transducers, etc. Such semiconductive materials are well known and they include the oxides, sulfides, selenides, or tellurides of zinc, cadmium or lead. However, during manufacture it is often found that the efficiency of such vapor-deposited films is quite poor due to the fact that these films conduct relatively large currents even when not being exposed to light. This undesirable current drain (when the photoconductor should be quiescent) is referred to as "dark conductivity" and is believed to be due to a stoichiometric excess of the particular metal used in the thin film semiconductor.

Since such dark conductivity is detrimental to the efficient opeartion of thin film devices, it has been customary to try to modify this dark condutivity by subjecting the thin film, after it has been evaporated on an appropriate substrate, to an annealing cycle, typically heating the thin film and substrate to temperatures of 350° C.–900° C. in a controlled atmosphere such as air, hydrogen chloride, hydrogen sulfide, sulfur vapor, or some combination of these. Although the annealing process generally reduces the unwanted dark conductivity, the elevated temperatures often result in damage to the substrate, e.g., conductive layers of the substrate frequency crystallize destroying their conductivity and rendering them useless, and impurities from the substarte often diffuse into the thin films which have been deposited on them, impairing efficiency of the semiconducting materials.

Therefore, prior to the invention herein, known methods for lowering the dark conductivity of thin semiconducting films have been far from satisfactory and relatively expensive, resulting in a high percentage of the materials being damaged or destroyed during processing.

SUMMARY OF THE INVENTION

According to the inevntion herein it is possible to decrease the dark conductivity of an ionic semiconductor which has been vapor deposited on a substrate as a thin film without subjecting the material to elevated temperatures, without reducing the efficiency of the semiconductor, and without causing side-effect damage to the substrate. Further, the method described herein can be carried out in room light as well as at room temperatures.

In the novel method disclosed herein, the dark conductivity of thin semiconductive films is reduced by an electrolytic treatment in which the device is immersed in an electrolytic solution containing a solvent and a soluble salt including the anion of the thin film being treated. The thin film itself is used as the anode, and the current is passed through it from a suitable cathode. The mechanism responsible for the reduction in dark conductivity is not known, but it is believed that the excess metal in the film, perhaps in the form of interstitial metal, combines with the soluble anion, thereby reducing the stoichiometrical excess.

Another advantage of the novel electrolytic process disclosed herein resides in the fact that the level of conductivity of the film being treated can be continuously monitored while the treatment is in progress. Therefore, in the event that a particular level of conductivity is desired in the thin film, this can be achieved simply by stopping the electrolytic process when the continuously-monitored level of conductivity has reached the desired value.

In preparing the electrolytic solution, an alkali or alkaline earth salt including the anion of the thin film being treated is placed in a suitable solvent. For instance, when the thin film being treated is comprised of cadmium sulfide, a sulfide anion is required, and the salt from which the soluble sulfide anion is to be obtained might be sodium sulfide or some other alkali sulfide or alkaline earth sulfide. Similarly, if the thin film comprises cadmium selenide, the required soluble selenide anion might be obtained from sodium selenide or from other alkali or alkaline earth selenides.

The concentration of the anion solution can vary anywhere from approximately 0.001 N to 0.2 N, and any solvent can be used so long as it does not attack the thin film or substrate being treated. Suggested as suitable solvents are alcohols, including aqueous alcohols, glycols, acetronitrile, and tetrahydrofuran. Ethanol is a preferred solvent, because it may be readily removed from the treated materials by evaporation when the treatment has been completed.

While anode current densities can range between approximately 0.025 and 75 milliamperes/square centimeter of the thin film acting as the anode, the preferred range is between about 0.25 and 75 milliamperes/square centimeter. Variations in current density do not appear to have appreciable effect on the ultimate level of conductivity which can be achieved with the process. However, the time required to reduce conductivity of the layer to its minimum value increase exponentially as the anode current density is decreased.

In addition to its other obvious and important advantages referred to above, the novel method disclosed herein is also quite efficient. For example, when cadmium sulfide is evaporated onto a substrate, its dark conductivity is of the order of $10^{-1}$–$10^{-3}$ ohms$^{-1}$ centimeter$^{-1}$. If this thin film is subjected to the electrolytic treatment described above, using an electrolyte including sodium sulfide, it is found that the conductivity of the cadmium sulfide layer can be decreased until it is in the order of $10^{-11}$ ohms$^{-1}$ centimeter$^{-1}$.

If a particular level of dark conductivity is desired, a relatively low anode current density can be used, and the process can be stopped as soon as the desired level of conductivity is reached. It should be particularly noted that the conductivity of the layer remains unchanged after it is removed from the electrolyte.

The invention may be further appreciated from the following specific examples which are provided merely for purposes of illustration of the general principles disclosed above, there being no intent to imply in any manner that the scope of the invention is to be limited to the specific materials and quantities set forth in the examples below:

EXAMPLE 1

An electrolyte composed of a 0.05 N solution of $$Na_2S \cdot 9H_2O$$

in 95 percent ethyl alcohol is placed in a beaker. A platinum electrode (1 x 10 cm.) is connected to the negative terminal of a source of potential, and a 2μ thick evaporated coating of CdS on Nesa glass cut to 1 x 10 cm. is connected to the positive terminal of the same power supply through a milliammeter. Both electrodes are then immersed in the electrolytic solution. The applied voltage is adjusted until a current of 50 ma. is obtained. Initially the conductivity of the CdS is observed to be $10^{-2}$ ohm$^{-1}$ centimeter$^{-1}$, and this conductivity decreases over a period of 30 minutes, becoming stationary at a value of $10^{-11}$ ohm$^{-1}$ centimeter$^{-1}$. The conductivity of the layer remained unchanged after it is removed from the electrolyte. Similar results are obtained with cadmium selenide films when sodium selenide is used in the electrolyte with lead oxide films when using sodium hydroxide in the electrolyte, with cadmium telluride when using sodium telluride, and with zinc sulfide when using sodium sulfide.

EXAMPLE 2

The process of Example 1 is repeated, with the exception that the current is increased to 250 ma. The conductivity reaches an equilibrium value in 6 minutes.

EXAMPLE 3

The process of Example 1 is repeated, using a current of .25 ma. Equilibrium is attained in 10 hours.

The invention has been described in detail with particular reference to certain preferred embodiments thereof, but it will be understood that variations and modifications can be effected within the spirit and scope of the invention.

We claim:

1. A method for lowering the conductivity of thin semiconducting films comprising the oxides, sulfides, selenides, or tellurides of metals selected from the group consisting of zinc, cadmium, and lead, said method comprising the steps of: immersing said film, as an anode, in an electrolytic solution comprising an alkali or alkaline earth metal salt containing the anion of said film, said salt being contained in a solvent for said salt which does not solubulize the semiconducting film in the absence of electrolysis, and passing a direct current between said film-anode and a cathode, the conductivity of such film being reduced at a rate proportional to the anode density of said current until an equilibrium value is reached.

2. The method according to claim 1 wherein said semiconducting film is cadmium sulfide and said electrolytic solution includes sodium sulfide.

3. The method according to claim 1 wherein said semiconducting film is cadmium selenide and said electrolytic solution includes sodium selenide.

4. The method according to claim 1 wherein said electrolytic solution further comprises a solvent selected from the group consisting of alcohols, glycols, acetonitrile and tetrahydrofuran.

5. The method according to claim 4 wherein said solvent is ethanol.

6. The method for lowering the conductivity of a thin film of cadmium sulfide evaporated on a substrate, said method comprising the steps of:

preparing an electrolytic solution comprising from 0.001 N to 0.2 N of $Na_2S \cdot 9H_2O$ in ethyl alcohol, immersing said film in said solution as an anode, and passing a direct current between said film anode and a platinum cathode, said current having an anode density ranging from 0.025 to 75 ma./centimeter$^2$, whereby the conductivity of said thin film is reduced progressively until it attains an equilibrium value.

References Cited

UNITED STATES PATENTS

| | | | |
|---|---|---|---|
| 2,391,706 | 12/1945 | Jackson et al. | 204—14.1 |
| 3,131,134 | 4/1964 | Micillo | 204—14 |

FOREIGN PATENTS

| | | |
|---|---|---|
| 433,025 | 2/1946 | Canada. |

DANIEL E. WYMAN, Primary Examiner

C. F. DEES, Assistant Examiner

U.S. Cl. X.R.

204—29